(12) United States Patent
Harris et al.

(10) Patent No.: US 11,048,734 B1
(45) Date of Patent: Jun. 29, 2021

(54) AUTO-COMPLETION BASED ON CONTENT SIMILARITIES

(71) Applicant: Pinterest, Inc., San Francisco, CA (US)

(72) Inventors: Jeffrey Harris, San Francisco, CA (US); Lulu Cheng, San Francisco, CA (US); Xixia Wang, Oakland, CA (US); Matthew Chun-Bong Fong, San Francisco, CA (US); Joseph Vito Zingarelli, San Francisco, CA (US); Long Cheng, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 351 days.

(21) Appl. No.: 16/105,413

(22) Filed: Aug. 20, 2018

(51) Int. Cl.
*G06F 16/332* (2019.01)
*G06F 16/338* (2019.01)
*G06F 16/35* (2019.01)

(52) U.S. Cl.
CPC ........ *G06F 16/3323* (2019.01); *G06F 16/338* (2019.01); *G06F 16/355* (2019.01)

(58) Field of Classification Search
CPC ... G06F 16/3323; G06F 16/355; G06F 16/338
USPC ................................. 707/722, 736
See application file for complete search history.

(56) References Cited

U.S. PATENT DOCUMENTS

| | | | | |
|---|---|---|---|---|
| 7,702,186 B1* | 4/2010 | Chandra | ................. | G06F 16/58 382/305 |
| 7,725,451 B2* | 5/2010 | Jing | ........................ | G06F 16/58 707/707 |
| 8,631,004 B2* | 1/2014 | Mishne | ............... | G06F 16/3322 707/727 |
| 9,703,459 B2* | 7/2017 | Li | .............................. | G06F 7/08 |
| 10,540,378 B1* | 1/2020 | Hsiao | ........................ | G06K 9/78 |
| 2007/0050352 A1* | 3/2007 | Kim | ........................ | G06F 40/274 |
| 2010/0306249 A1* | 12/2010 | Hill | ........................ | G06Q 50/01 707/769 |
| 2014/0188843 A1* | 7/2014 | Smiling | ............... | G06F 16/156 707/722 |
| 2014/0310255 A1* | 10/2014 | Cardell | ............... | G06F 16/5866 707/706 |
| 2015/0134688 A1* | 5/2015 | Jing | .................... | G06F 16/5866 707/766 |
| 2016/0098416 A1* | 4/2016 | Li | ..................... | G06F 16/90324 707/767 |
| 2017/0024424 A1* | 1/2017 | Almohizea | ........... | G06F 16/248 |
| 2017/0185670 A1* | 6/2017 | Dua | .................... | G06F 16/5866 |
| 2017/0185869 A1* | 6/2017 | Dua | ........................ | G06K 9/52 |
| 2017/0277770 A1* | 9/2017 | Singh | ................. | G06F 16/2246 |

* cited by examiner

*Primary Examiner* — Michael Pham
(74) *Attorney, Agent, or Firm* — Athorus, PLLC

(57) ABSTRACT

Systems and methods for providing auto-completion options to input characters are presented. In response to receiving input characters, a plurality of items of content (that are non-textual items of content) of a corpus of content are identified. These items of content are clustered into n clusters of content according to similarities among the items of content. From the items of content of each cluster, a descriptive title is determined for the cluster. This descriptive title is an auto-completion option for the cluster. The descriptive titles/auto-completion options are provided in response to receiving the input characters.

20 Claims, 7 Drawing Sheets

AUTO-COMPLETION BASED ON CONTENT SIMILARITIES

BACKGROUND

Auto-completion is a user-interface feature, implemented by a computer process in which, given an incomplete portion of a word or phrase of a computer user's request, the computer process predicts one or more end results—i.e., determines a completed word or phrase that the process predicts that the user intends to supply as the request—and presents the one or more predicted completed results to the computer user for selection.

Auto-completion is viewed favorably among most computer users due to its convenience: the user need not complete a word or phrase, just select an appropriate suggestion from the predicted completed queries after typing a few characters.

Current implementations of auto-completion are based upon text or textual content. More particularly, during a text input process, after receiving a few text input characters the computer process predicts one or more completed textual words or phrases from the received input characters. Unfortunately, there can be no reasonable prediction if the computer user does not provide correct words or phrases to adequately describe the request. Indeed, the auto-completion feature is unlikely to provide the desired predicted results if the input characters do not represent what is desired. Additionally, when based solely on text, the auto-completion process cannot identify completion options (words or phrases) that may be related but not based on or derived from the input characters.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
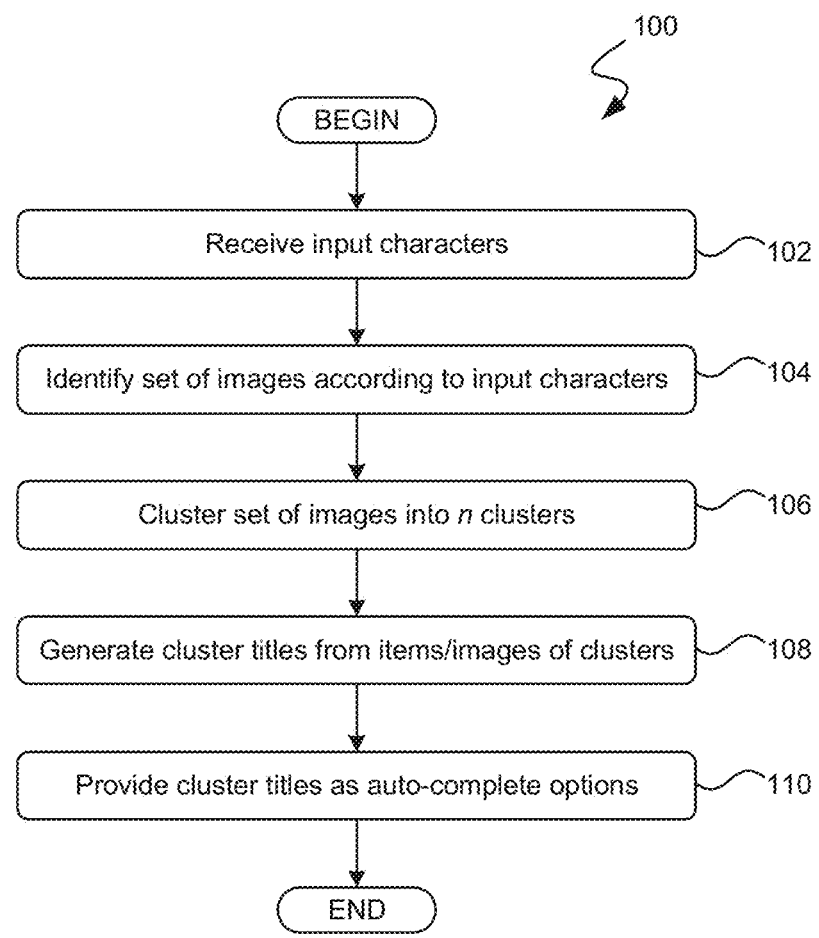
FIG. 1 is a flow diagram illustrating an exemplary routine suitable for providing auto-completion recommendations to input characters based on image data in a corpus of image content in accordance with aspects of the disclosed subject matter.

In contrast to predicting auto-completion results based solely and simply on textual completion of the inputted text content, the disclosed subject matter is directed to leveraging a large corpus of image data and image similarities to generate predicted auto-completion results. Advantageously, by leveraging the corpus of image data, auto-completion predictions may be identified corresponding to image content that might not readily be described in text/words. Further, auto-completion predictions may be identified where the textual content only referentially describes the ultimate purpose of a computer user's request, and may further include predicted results that are not textual completions of the input characters.

According to aspects of the disclosed subject matter, in response to receiving one or more input characters, these characters comprising an incomplete request from a computer user, a set of images from a corpus of images is identified. These images are identified according to the input characters. Subsequently, these images are clustered into a predetermined number (denoted as "n") of image clusters. For each of the n clusters, a descriptive cluster title is extracted/generated. Each descriptive cluster title is viewed as an auto-completion prediction for the input characters. The descriptive cluster titles are then presented to the user as a set of auto-completion predictions. Advantageously, as the auto-completion predictions are already associated with a cluster of images, response to the selection of one of the auto-completion predictions to view related images is also substantially enhanced.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

Reference will be made to the terms embeddings and feature vectors (also referred to as embedding vectors). For purposes of clarity and definition, an "embedding" is a value derived from and is a representation of some aspect or element of an item of content, such as an image. For example, an embedding may correspond to a particular color at a particular location within an image. Typically, though not exclusively, embeddings are determined as a result of processing and analysis, called convolutions, of a deep neural network. More well-known examples of convolutional deep neural networks include (by way of illustration and example only) Deep Dream Generator directed to computer vision, DeepVariant directed to genome sequencing, and the like. Generally speaking, a deep neural network accepts one or more items of input data, processing the input data through multiple layers of the neural network to produce one or more embedding values as a feature vector, where the input from one layer of the deep neural network becomes the input data of the next layer of the deep neural network, and where the processing at each layer is referred to as the convolution.

With regard to generating embedding information of an item of content through a convolutional deep neural network, for purposes of this disclosure, processing an item of content, such as an image, refers to processing the item of content itself as well as any metadata that may be associated with that item of content. Metadata may comprise information regarding content type (e.g., image, audio, video, data type, etc.) and textual content associated with the item of content (e.g., descriptions of the item, titles, uniform resource identification data, etc.) In this context, an embedding is convolved from the item itself and associated metadata.

A feature vector (also called an embedding vector) is a collection of embeddings (values) regarding the input item of content, e.g., an image and associated metadata. More particularly, a feature vector is an n-dimensional vector of embeddings (each embedding represented as a numerical value—often a floating point value—to facilitate processing and analysis) that represents one or more aspects of the input item of content. As indicated above, typically though not exclusively, an embedding vector of an item of content is determined according to convolutions of a deep neural network, which is a machine learning model.

The embedding/values space associated with these feature vectors is often called a feature space. Additionally, and as part of the deep neural network processing, in order to reduce the dimensionality of the feature space, a number of dimensionality reduction techniques may be employed in generating a feature vector for an item of content.

For purposes of clarity and definition, the term "request" refers to a submission from a computer user for which a response is expected. A computer user typically inputs the request by entering input characters through a user interface mechanism that, when completed, form the completed request (which is then processed). According to aspects of the disclosed subject matter, as the computer user enters the input characters of a request, but has not completed entering the complete request, an auto-completion process may predict one or more auto-completion options for the computer user. These auto-completion options, if selected/activated by the computer user, operate as though the computer user completed the request (according to the selected option) and submitted the completed request for processing.

For purposes of clarity and definition, the term "stemming" refers to linguistic morphology and information retrieval with regard to the process for reducing inflected (or sometimes derived) words to their word stem, base or root form, and in regard to the disclosed subject matter, a textual form. As those skilled in the art will appreciate, stemming does not include identifying synonymous words that have, at their base, distinct roots.

While the following description is made in regard to leveraging images of a corpus of images, it should be appreciated that embodiments of the disclosed subject matter may be suitably applied to items other than images. For example, aspects and embodiments of the disclosed subject matter may be applied to bodies of audio content, video content, PDF files, and other types of non-textual content.

As suggested above and as will be described in further detail below, in contrast to simply conducting a textual analysis to predict possible completed textual results, the disclosed subject matter identifies a set of images from a large corpus of images according to received input characters, processes the images into a predetermined number of clusters, and extracts a descriptive cluster title from each cluster. These descriptive cluster titles are then used as auto-completion options for the partially completed request. Advantageously, these auto-completion options are not limited to textually stemming from the initial input characters but can branch into descriptive auto-completion options that do not stem from the input characters. This, of course, leads to a richer set of auto-completion options that can better identify the actual intent of the computer user and/or expand the breadth of the request for the computer user. Additionally, auto-completion results can be identified that may not be readily described with words/phrases.

To illustrate the generation of auto-completion options for input characters of an incomplete request, reference is made to the figures. FIG. 1 is a flow diagram illustrating an exemplary routine 100 suitable for providing auto-completion recommendations to input characters based on image data in a corpus of image content, and in accordance with aspects of the disclosed subject matter. Beginning at block 102, input characters of a computer user's request are received. Typically, though not exclusively, the input characters represent an incomplete version of the request of the computer user.

At block 104, a set of images, e.g., images of a large corpus of images, is identified according to the input characters. According to one, non-limiting embodiment of the disclosed subject matter, identifying the set of images is carried out in conjunction with an index of tags (also referred to as image tags or, more generically, content tags) associated with the images of the corpus. More particular, images in the corpus of images are tagged with one or more tags. The input characters received in block 102 are then matched or partially matched to the various tags, and the images associated with the matched tags are included in the identified set of related content items. In this regard, if the input characters match or partially match a textual representation of a tag, the content items associated with the matched tag are included in the set of related content items. Of course, the input characters may be matched to a plurality of tags. Matching or partial matching refers to a full or partial similarity between the textual representations of the tags and the input characters, and may be based upon linguistic roots and/or stemming, as well as a threshold matching distance between tags and the input characters.

It should be appreciated that, in regard to matching the input characters to one or more tags, this matching may be (and in many cases, will be) an imperfect match. Accordingly, threshold matching may be employed such that when all or some portion (e.g., 70% or more of the input characters) are found within the tag (i.e., the textual name of the tag), the tag is considered to be a match of the input characters. Root stemming and conjugation may be employed to expand the matching of the input characters to tags.

In an alternative embodiment of matching the input characters to content items, the input characters may be converted to a feature vector using a null content item. This embodiment is used when the various images of the corpus of images are each associated with a corresponding feature vector. In this embodiment, while the feature vector of the input characters will be mostly null (based on the null content item), the input characters can be matched to feature vector elements that are derived from textual metadata associated with one or more content items. In this embodiment, those content items that have the most similar non-null comparisons are included in the set of related content items. Additionally, to further expand the number of items in the set of related items, content items that are in the "neighborhood" of the matched content items may also be included in the set of related content items, relying on the theory that content items in a neighborhood of the corpus of items are similar in nature.

At block 106, the set of images are clustered into a determined number n of clusters. According to aspects of the disclosed subject matter, this number n of clusters may be dynamically provided to the routine by some feature requesting auto-completion options for the input characters. Additionally or alternatively, the number n of clusters may be dynamically determined as a function of the display area for presenting auto-completion options to a computer user. Still further or alternatively, the number n of clusters may be a predetermined number, including one that is predetermined at the time of configuration of the routine 100. By way of illustration and not limitation, the number n of clusters may be determined to be 5.

According to aspects of the disclosed subject matter, the clustering is made based on image similarities, or based on similarities within their corresponding, associated feature vectors. Advantageously, basing the clustering on the images' feature vectors and/or on image similarities provides for a diversification of the descriptive titles or tags of the clusters that are used as auto-completion options. Utilizing the feature vectors recognizes that essential elements of the items of content have already been processed and identified (through the convolutional deep neural network discussed above), such that image content processing is not necessary at this point. In short, a set of images corresponding to the descriptive title is already identified and ready for presentation to the user. Of course, this leads to substantial processing bandwidth savings as the processing (through the convolutional deep neural network) has been conducted previously.

While any number of techniques for clustering the identified images may be employed, in one embodiment a K-means clustering technique is employed to cluster the content items/images. Indeed, multiple K-means clustering passes may be conducted to ensure that n clusters are generated. Of course, other algorithms may also be utilized including, by way of illustration and not limitation, the Density-Based Spatial Clustering of Applications with Noise (DBSCAN) algorithms, the Ordering Points To Identify the Clustering Structure (OPTICS) algorithms, and the like.

After clustering the set of related content into the n clusters, at block 108 a descriptive cluster title or tag is generated for each cluster. Generating these descriptive titles comes from the textual metadata associated with each of the images. Reliance may be made on the text-based data in the feature vectors of the items of content. According to various embodiments of the disclosed subject matter, one or more various text processing techniques may be used to identify the descriptive cluster titles. These techniques include, by way of illustration and not limitation, K-means clustering of words, Latent Semantic Indexing (LSA), TF-IDF (Term Frequency-Inverse Document Frequency) techniques, and the like. Descriptive titles may also be processed according to lexical analysis to result in grammatic ordering of terms.

After generating/extracting the descriptive titles from each of the n clusters, at block 110 the cluster titles are provided as auto-completion options to the input characters. Thereafter, routine 100 terminates.

Figure 2:
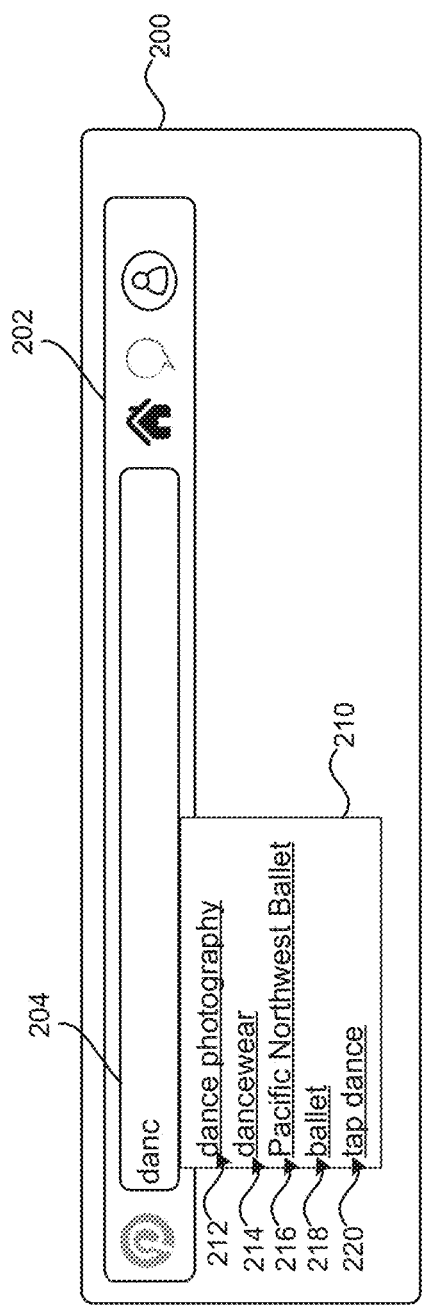
FIGS. 2 and 3 are block diagrams illustrating portions of exemplary user interfaces for providing auto-completion recommendations in accordance with aspects of the disclosed subject matter.
Figure 3:
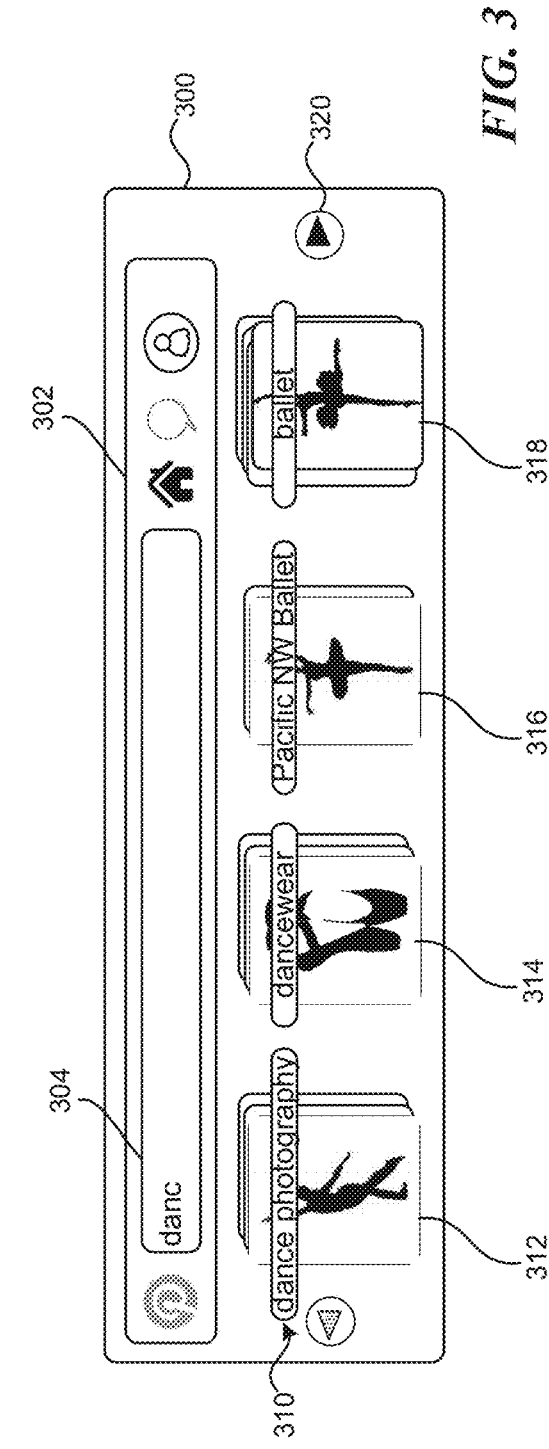

FIGS. 2 and 3 are block diagrams illustrating portions of exemplary user interfaces 200 and 300 for providing auto-completion recommendations in accordance with aspects of the disclosed subject matter. As shown in FIG. 2, the exemplary user interface 200 includes a request bar 202 into which a computer user can enter a text-based request in an input field 204. As shown in FIG. 2 and in this example, the computer user has entered a partial input request "danc". An auto-completion process (or sub-process), such as described in regard to routine 100 above, has identified a set of auto-completion options 210, comprising auto-completion options 212-220, for the partial input request "danc." Advantageously and in accordance with aspects of the disclosed subject matter, from clustering a set of related images and extracting descriptive titles from the clusters, auto-completion options that do not include or stem from the partial input request "danc" have also been identified, e.g., auto-completion options 216 and 218.

In regard to the exemplary user interface 300 of FIG. 3, in addition to identifying auto-completion options, content items (in this example, images) from the various clusters may be presented as auto-completion stacks. In this example, each auto-completion stack 312-318 corresponds to an auto-completion option, e.g., auto-completion stack 312 corresponds to auto-completion option 310 "dance photography." In this example, by clicking on the auto-completion option/stack, the computer user is provided with a corresponding set of content items/images related to its corresponding descriptive title. Advantageously, as the images of each cluster/stack have already been identified, near instantaneous display of related images for any auto-completion option is realized.

Regarding the number of clusters, n, that are generated, as discussed above and in some embodiments this number is determined in a manner to correspond to the display capacity of the user interface. In other words, if the amount of display area or presentation space is limited (as may be the case on a mobile phone device), then the number n of clusters may be restricted accordingly, i.e., limited according the presentation space for representative images of the clusters. In the illustrated user interface 300, the control arrow 320 indicates that there are additional auto-completion options from which a user can choose.

Figure 4:
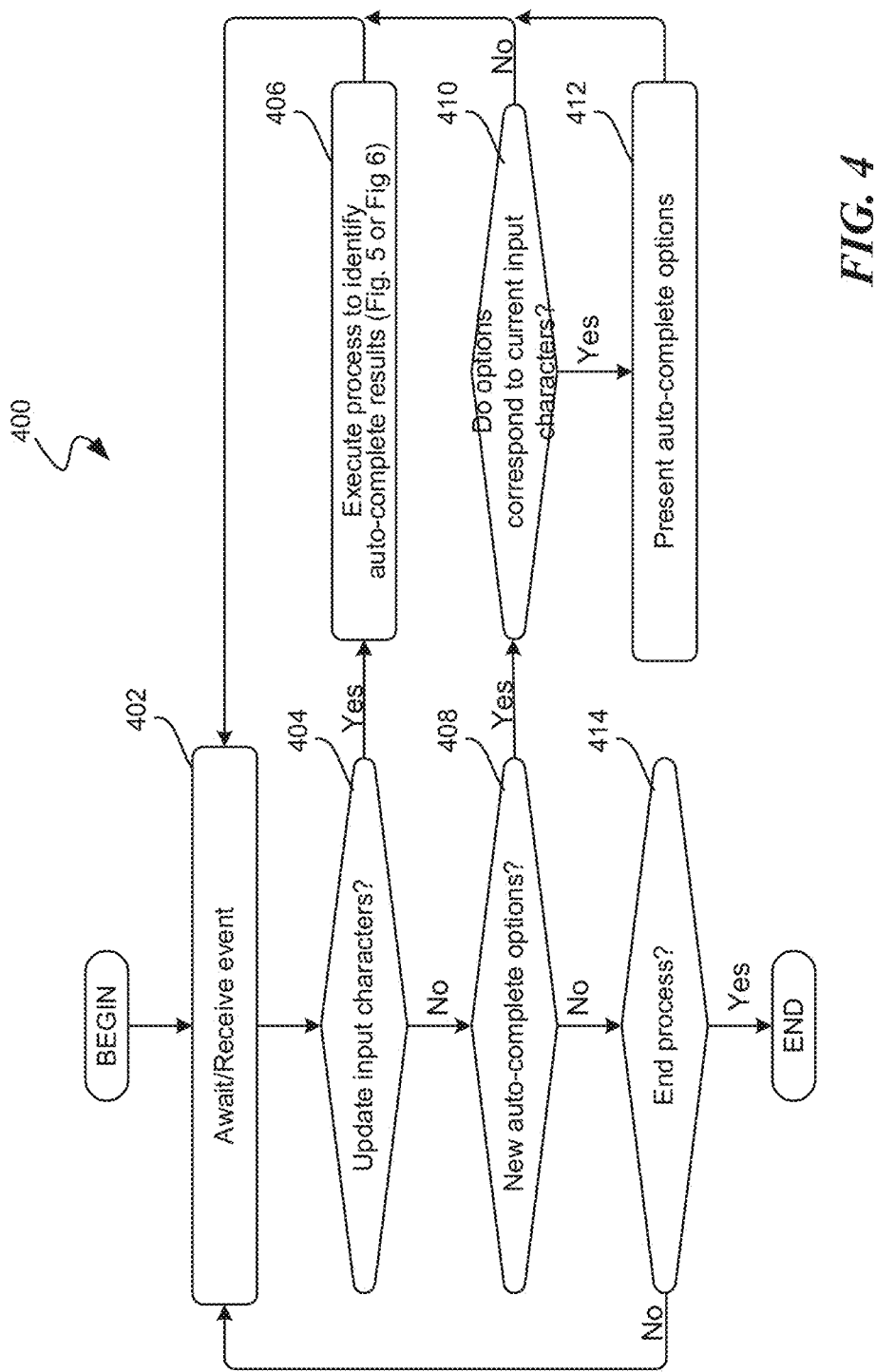
FIG. 4 is a flow diagram illustrating an alternative exemplary routine suitable for providing auto-completion recommendations of a partial input string in accordance with aspects of the disclosed subject matter.

While routine 100 of FIG. 1 illustrates a basic routine for determining auto-completion options for an input characters (that represent an incomplete input request), in many circumstances it may be necessary to generate auto-completion options in an asynchronous manner to receiving input characters. More particularly, since a computer user can often enter several input characters faster than auto-completion processes can generate auto-completion options, it may be necessary to operate an auto-completion process in an asynchronous manner, freeing the user to enter as many or as few input characters as desired and without forcing the auto-completion process to finish with the entry of each character. This is especially important when factoring in network connectivity issues between a user's device and an online service providing the auto-completion functionality. Indeed, synchronous identification of auto-completion options may be viewed as unnecessarily slowing the user's interaction. In this light, FIG. 4 presents a flow diagram illustrating an exemplary routine 400 suitable for providing auto-completion recommendations of a partial input string based on image similarities and in accordance with aspects of the disclosed subject matter.

Beginning at block 402, the auto-completion routine/process 400 awaits an event/action from the computer user. After receiving an event, at block 404 a determination is made as to whether the event is in regard to receiving updated input characters, for which auto-completion options are requested. If the event indicates the receipt of updated input characters, the routine 400 proceeds to block 406.

At block 406, an asynchronous process for generating auto-completion options for a given set of input characters is begun. Thereafter the routine 400 returns to block 402 to await/receive an event. The asynchronous process/routine for generating auto-completion options for a given set of input characters is set forth in regard to FIGS. 5 and/or 6.

Figure 5:
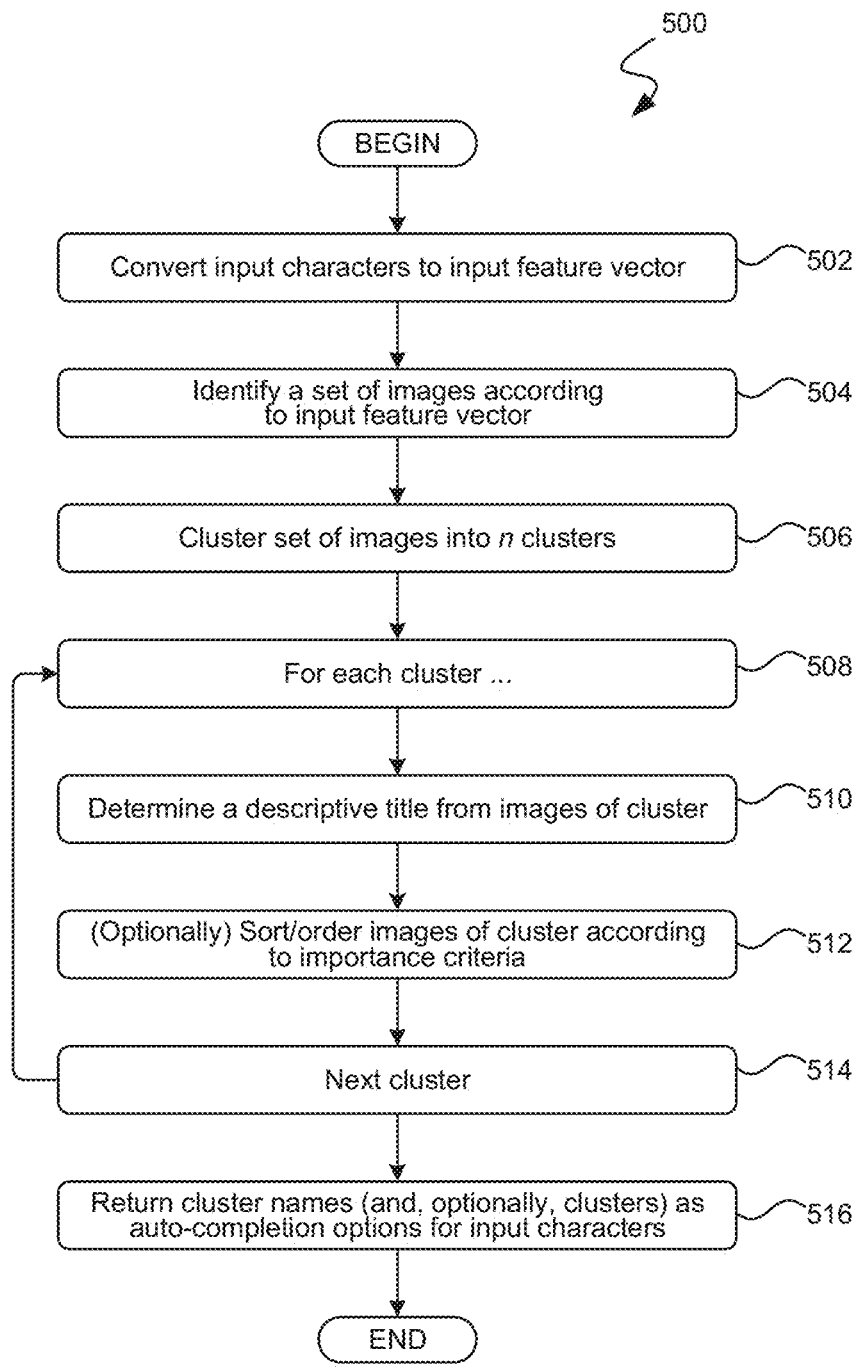
FIG. 5 is a flow diagram illustrating an exemplary auto-completion prediction routine for generating auto-completion predictions according to aspects of the disclosed subject matter.

Turning to FIG. 5, this figure shows an exemplary auto-completion prediction routine 500 for generating auto-completion predictions for a given set of input characters according to aspects of the disclosed subject matter. Beginning at block 502 and according to one embodiment of the disclosed subject matter, the input characters (for which the auto-completion options are to be generated) may be converted into an input feature vector.

Converting the input characters into a feature vector is carried out in the same way as generating a feature vector for an image and its metadata. In this, a null image is provided with the input characters as the metadata. The combined data is then provided as input data to a deep neural network model that processes the data and generates a feature vector—the input feature vector. Of course, this input feature vector includes mostly empty, null feature fields, having only data corresponding to the input characters. However, comparisons can be made against the feature vectors of a large corpus of content (e.g., a large corpus of images and corresponding metadata) based on fields having values corresponding to the metadata.

At block 504, the input feature vector is compared against feature vectors of a large corpus of content items to identify those items that are most similar to the input feature vector. According to aspects of the disclosed subject matter, the feature vectors of this corpus of content may be indexed according to various elements of the feature vectors in order to more efficiently identify similar/related content items. In one embodiment, if relevant elements of the feature vectors (i.e., those elements/fields of the feature vectors that have content derived from textual content) have a threshold amount of similarity or commonality, the corresponding images/items of content are included among the set of results.

In an alternative embodiment, instead of converting the input characters into textual content, elements within feature vectors that correspond to textual metadata relating to the content items are identified, and the input characters are compared against these various elements/fields. In this regard, again the feature vectors of the corpus of content are indexed in a manner such that related items can be readily identified.

In yet another, alternative embodiment, the input characters may be matched or partially matched to tags associated with the images of the corpus of images. The corpus of images is indexed in a variety of ways, including the tags. As described above in regard to routine 100, matching or partial matching of the input characters against the tags is conducted, and images associated with those tags that match or partially match the input characters are included in the set of images.

After having identified the set of images, at block 506, these images are clustered into n clusters. In the context of images, the images are clustered according to any one or more techniques including, by way of illustration and not limitation, K-means clustering of words, Latent Semantic Indexing (LSA), TF-IDF (Term Frequency-Inverse Document Frequency) techniques, and the like. As indicated above, this clustering is conducted, in one or more passes, to generate the n clusters.

After the n clusters of images have been generated, at block 508 an iteration loop is begun to iterate through each of the n clusters. At block 510, a descriptive title for the currently iterated cluster of images/content items is conducted. As indicated above, while any number of techniques for clustering the identified images may be employed, in one embodiment a K-means clustering technique is employed to cluster the items. Indeed, multiple K-means clustering passes may be conducted to ensure that n clusters are generated. Of course, other algorithms may also be utilized including, by way of illustration and not limitation, the Density-Based Spatial Clustering of Applications with Noise (DBSCAN) algorithms, the Ordering Points to Identify the Clustering Structure (OPTICS) algorithms, and the like.

In addition to identifying the various cluster names, the images within the clusters is optionally ordered and/or sorted, as in shown in block 512. This optional ordering/sorting is carried out such that the "best" images for the clusters may be selectively presented to the computer user. For example, when presenting both auto-completion options and content clusters, as discussed above in regard to FIG. 3, figures within a cluster are sorted and/or ordered such that those figures that are most likely to represent the particular cluster, and/or those figures of the particular cluster that are the most popular among users, and/or those figures of the particular cluster that are of the highest quality, and/or those figures of the particular cluster that are determined to be the most attractive are ordered and sorted such that they are initially presented to the computer user if and when the user selects the corresponding auto-completion option.

At block 514, if there are additional clusters to process, the routine 500 returns to block 508 where another cluster is identified in the iteration process. Alternatively, if there are no more clusters to process, the routine 500 proceeds to block 516.

At block 516, the routine 500 returns the descriptive titles/cluster names and (optionally) the clusters of images themselves—or references to the clusters—to the calling routine as auto-completion options for the input characters. In one embodiment, returning the auto-completion options causes an event (new auto-completion options event) that is received at block 402 of routine 400. Thereafter, the routine 500 terminates.

Figure 6:
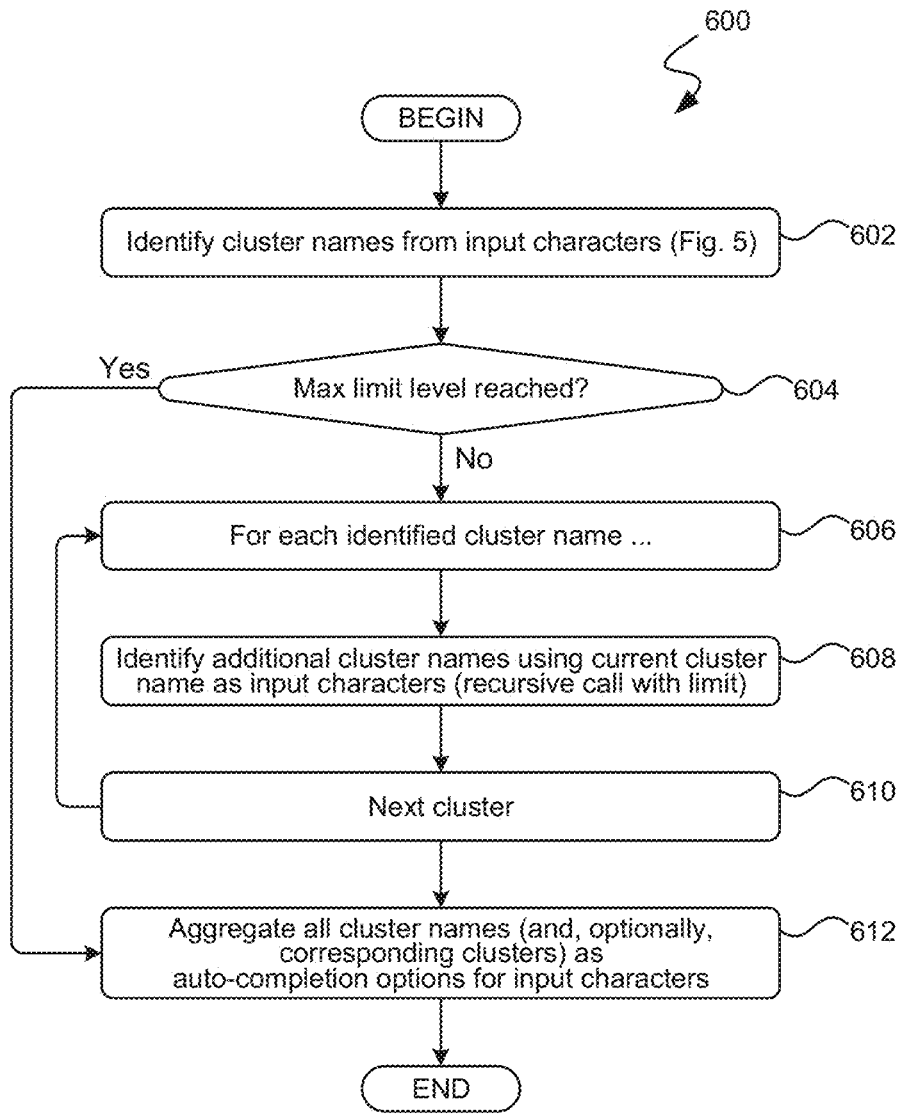
FIG. 6 is a flow diagram illustrating an exemplary alternative auto-completion prediction routine for generating auto-completion predictions for a given set of input characters according to aspects of the disclosed subject matter.

Returning again to FIG. 4, it should be appreciated that instead of a call to routine 500 of FIG. 5, an alternative call may be made to routine 600 of FIG. 6 (discussed below), in which initial auto-completion options may be expanded to identify additional auto-completion options.

After having identified cluster names (i.e., auto-completion options) with optional image clusters, if at block 402 the event is not updated input characters, the routine 400 proceeds to block 408. At block 408, a determination is made as to whether the event is a new auto-completion options event. If the event is in regard to new auto-completion options, the routine proceeds to block 410 where an additional determination is made. At block 410, recognizing that auto-completion options may lag behind the input of characters, if the new auto-completion options correspond to the current input characters, the routine proceeds to block 412.

At block 412, the new (newest) auto-completion options are presented to the computer user. However, if at block 410, the new auto-completion options do not correspond to the current input characters, the routine 400 returns to block 402 to await additional auto-completion options.

If, at block 408, the event is not in regard to new auto-completion options, the routine 400 proceeds to block 414 where a determination is made as to whether the event is an instruction to terminate the routine/process 400. If so, the routine 400 terminates. Alternatively, the routine 400 returns to block 402 to await additional events.

Of course, it should be appreciated that there may be many other events that are also received and processed, which are not described in this routine 400. Accordingly, routine 400 should be viewed as simply illustrative of certain elements of an auto-completion routine.

While additional auto-completion options are identified using the input characters, as described, above, a greater breadth of auto-completion options may be identified by expanding on auto-completion options/descriptive titles that are initially derived as discussed in regard to FIG. 5. FIG. 6 is a flow diagram illustrating an exemplary auto-completion prediction routine 600 for generating auto-completion predictions for a given set of input characters according to aspects of the disclosed subject matter.

Beginning at block 602, cluster names (with optional corresponding image clusters) are identified from the input characters provided by a computer user. Identifying the cluster names is described above in regard to routine 500 of FIG. 5.

At decision block 604, a determination is made as to whether a limit, corresponding to the number of recursive calls that can be made, has been reached. In this regard, in addition to "input characters" for which auto-completion options are to be identified, a limit level is also passed. Advantageously and as those skilled in the art will appreciate, this level allows for a recursive call of routine 600 while, at the same time, prevents continual recursion. If the limit level has been reached, the routine 600 proceeds to block 612 described below. Alternatively, if the limit level has not yet been reached, the routine proceeds to block 606.

Expanding on the initial auto-completion options identified in block 602 (i.e., the cluster names), at block 606 an iteration loop is begun for each identified cluster name. At block 608, additional n cluster names are identified using the currently iterated cluster name as "input characters" to a recursive call to this routine 600. In addition to the "input characters," an increased limit value is passed. For example, when recursively calling the routine 600, the limit level passed may simply be increased by one for the recursive call. The results of this recursive call are to obtain n cluster names with optional image clusters.

After expanding the current cluster name, at block 610, if there are additional cluster names to process, the routine 600 returns to block 606 to process the additional clusters names. Alternatively, if all cluster names have been expanded, the routine 600 proceeds to block 612.

At block 612, the cluster names identified in block 602 and from the recursive calls to block 608, are aggregated. Optionally, corresponding image clusters for the various cluster names, are also aggregated and the clusters names and optional clusters are returned as auto-completion options. Thereafter, the routine 600 terminates.

Regarding routines 100, 400, 500 and 600 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 8 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
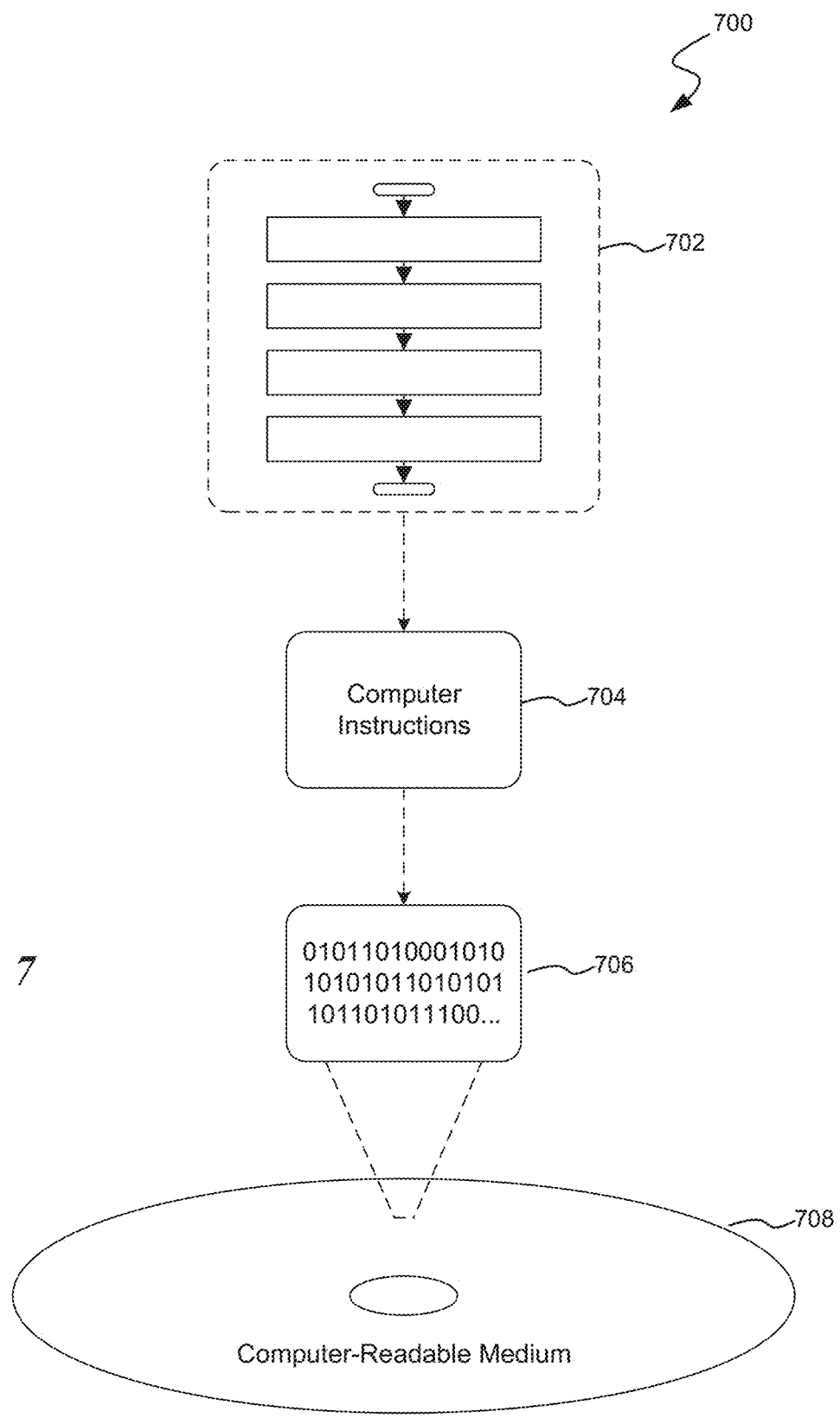
FIG. 7 is a block diagram illustrating an exemplary computer readable medium encoded with instructions for generating auto-completion predictions in accordance with aspects of the disclosed subject matter.

Regarding computer readable media, FIG. 7 is a block diagram illustrating an exemplary computer readable medium encoded with instructions for generating auto-complete options from input characters, as described in regard to routines 100, 400, 500 and 600. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routines 100, 400, 500 and 600, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
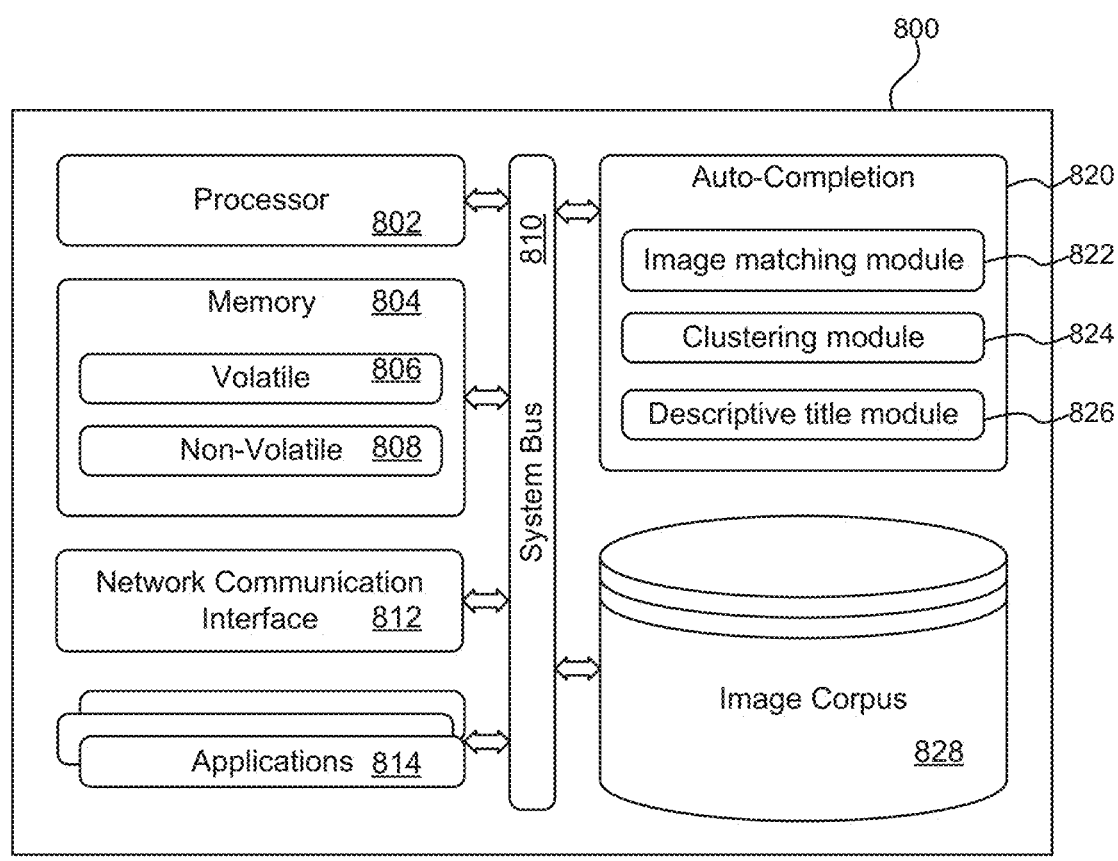
FIG. 8 is a block diagram illustrating an exemplary computing system (or computing device) suitably configured for generating auto-completion predictions in accordance with aspects of the disclosed subject matter.

Turning now to FIG. 8, FIG. 8 is a block diagram illustrating an exemplary computing system 800 (or computing device) suitably configured for implementing an auto-completion process in accordance with aspects of the disclosed subject matter. The computing system 800 typically includes one or more processors (or processing units), such as processor 802, and further includes at least one memory 804. The processor 802 and memory 804, as well as other components of the computing system, are interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

As will be further appreciated by those skilled in the art, the processor 802 executes instructions retrieved from the memory 804, from computer readable media, such as computer readable media 700 of FIG. 7, and/or other executable components in carrying out the various functions of recommending likely digital content items for a content collection. The processor 802 may be comprised of any of a number of available processors such as single-processor, multi-processor, single-core units, and multi-core units, which are well known in the art.

Further still, the illustrated computing system 800 typically also includes a network communication interface 812 for interconnecting this computing system with other devices, computers and/or services over one or more computer networks. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network).

The computing system 800 further includes one or more applications 814 that may include user interfaces in which auto-completion functionality, as described herein, are desired. An application is a computer-executable software designed to perform a group of coordinated functions, tasks, or activities for the benefit of a computer user. The application comprises a collection of data and/or computer instructions that tell the computer how to operate. Applications include so-called "apps" which are typically small applications, often designed for operation on mobile devices, that have a smaller focus and narrow functionality. Examples of applications include, by way of illustration and not limitation, a word processor, a spreadsheet, an accounting application, a web browser, a media player, a console game, a photo editor, and the like.

The computing system 800 also includes an executable auto-completion module 820. The auto-completion module 820, in execution and as described above, receives an auto-completion request, including input characters and, in response returns one or more auto-completion options and, optionally, corresponding sets of images.

The auto-completion module 820 may be implemented as one or more executable hardware components of the computer system 800, such as within a programmable logic array (PLA), a programmable read-only memory (PROM), an erasable programmable read-only memory (EPROM), and/or other hardware components. Alternative and/or additionally, the auto-completion module 820 may be implemented as executable software instructions. These executable software instructions may be stored in memory 804 or on computer-readable media 700. The auto-completion module 820 may be implemented to operate in a variety of manners including as an online service servicing requests over a network (via the NIC 812), as an operating system service of the computer system 800, and/or as part of an application (such as application 814) on the computing system 800.

In execution, the auto-completion module 820 receives input characters of a computer user, identifies one or more auto-completion options, and returns the auto-completion options to the requesting process. Additionally, the auto-completion process may produce corresponding results, i.e., clusters of images each associated with an auto-completion option.

For illustration purposes, the auto-completion module 820 is shown as including an image matching module 822. The image matching module 822 is an executable module that, in execution, matches input characters to a set of images of an image corpus 828. Matching input characters to images of the image corpus 828 may be conducted via a variety of manners including, as described above, performing matching (or partial matching) to tags associated with the images of the image corpus, and in generating an input feature vector for the input characters and matching the input feature vector to images of the image corpus.

The auto-completion module 820 is further shown as including a clustering module 824. The clustering module 824 is also an executable module, implemented as executable code and/or as executable hardware components, configured to generate n clusters from an identified set of clusters. Identifying clusters among the set of images may be made according to image similarities, feature vector similarities, a combination of both image similarities and feature vector similarities, and the like, as set forth in the above in regard to routines 100, 500 and 600.

Further still, the auto-completion module 820 is shown as including a descriptive title module 826. This descriptive title module 826 is an executable module, similar to those described above, and in execution, this module extracts descriptive titles of the various clusters of images generated by the clustering module 824. As set forth above in regard to routines 100, 400, 500 and 600, the descriptive title module identifies a text-based descriptive title from each cluster, where the descriptive title of each cluster serves as an auto-completion option for that cluster of images.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for providing auto-completion options to input characters, the method comprising:
    receiving input characters as a request for auto-completion options;
    identifying a set of content items from a corpus of content items relating to the input characters;
    clustering the content items of the set of content items into a plurality of initial clusters, the plurality of initial clusters comprising a determined number of initial clusters determined according to an amount of presentation space for presenting the auto-completion options;
    for each initial cluster, determining a descriptive title for the initial cluster from the content items in the initial cluster; and
    providing the descriptive titles of the plurality of initial clusters as auto-completion options for the input characters.

2. The computer-implemented method of claim 1, further comprising:
    for each initial cluster:
        identifying a second set of content items from the corpus of content items relating to a descriptive title of an initial cluster;
        clustering the identified content items of the second set of content items into a plurality of expanded clusters; and
        for each expanded cluster, determining a descriptive title for the expanded cluster from the content items in the expanded cluster; and
    providing the descriptive titles of the plurality of initial clusters and the descriptive titles of the plurality of expanded clusters as auto-completion options for the input characters.

3. The computer-implemented method of claim 1, wherein:
    the content items in the corpus of content items are associated with one or more content tags of a plurality of content tags; and
    wherein identifying the set of content items from the corpus of content items relating to the input characters comprises:
        matching the input characters to a set of content tags of the plurality of content tags according to textual representations of the content tags; and
        including content items associated with one or more matching tags of the set of content tags in the set of content items.

4. The computer-implemented method of claim 3, wherein matching the input characters to the set of content tags of the plurality of content tags according to textual representations of the content tags comprises at least partially matching the input characters to the textual representations of the content tags.

5. The computer-implemented method of claim 4, wherein a partial match of the input characters to the textual representation of a content tag comprises meeting a predetermined threshold level of similarity between the input characters and the textual representation of a content tag.

6. The computer-implemented method of claim 1, wherein:
    each content item in the corpus of content items is associated with a feature vector; and
    identifying the set of content items from the corpus of content items relating to the input characters comprises:
        generating an input feature vector according to the input characters;
        matching the input feature vector to the feature vectors of the content items in the corpus of content; and
        including those content items in the set of content items where the feature vector of the content items has a threshold level of similarity to the input feature vector of the input characters.

7. The computer-implemented method of claim 6, wherein:
    the feature vectors of each content item in the corpus of content items are generated as a convolution of the content item and metadata corresponding to the content item; and
    matching the input feature vector of the input characters to the feature vectors of content items in the corpus of content items comprises matching elements of the input feature vector to elements of the feature vectors of the content items that are derived from the metadata corresponding to the content items.

8. The computer-implemented method of claim 1, wherein clustering the content items of the set of content items into a plurality of initial clusters comprises clustering the content items of the set of content items into a supplied number of initial clusters.

9. The computer-implemented method of claim 1, wherein clustering the content items of the set of content items into the plurality of initial clusters comprises clustering the content items of the set of content items into the determined number of initial clusters according to the execution of a K-means clustering algorithm utilizing metadata associated with the content items of the set of content items.

10. The computer-implemented method of claim 1, further comprising:
    for each initial auto-completion option for the input characters, providing access to the corresponding initial cluster of content items in a presentation space for presenting the initial cluster.

11. A non-transitory computer-readable medium bearing computer executable instructions which, when executed on a computing system comprising at least a processor retrieving instructions from the medium, carry out a method for providing auto-completion options to input characters, the method comprising:

receiving input characters as a request for auto-completion options;

identifying a set of images from a corpus of images relating to the input characters;

clustering the images of the set of images into a plurality of image clusters, the plurality of image clusters comprising a determined number of image clusters based on an amount of presentation space for presenting the auto-completion options;

for each of the image clusters, determining a descriptive title for the image cluster from data relating to the images in the image cluster; and providing the descriptive titles of the plurality of clusters as auto-completion options for the input characters;

wherein at least one of the auto-completion options for the input characters does not textually stem from the input characters.

12. The non-transitory computer-readable medium of claim 11, wherein:

images in the corpus of images are associated with one or more content tags of a plurality of content tags; and wherein identifying the set of images from the corpus of images relating to the input characters comprises:

matching the input characters to a set of tags of the plurality of tags according to textual representations of the content tags; and including images of the corpus of images associated with one or more matching tags in the set of images.

13. The non-transitory computer-readable medium of claim 12, wherein matching the input characters to the set of tags of the plurality of tags according to textual representations of the tags comprises at least partially matching the input characters to the textual representations of the tags.

14. The non-transitory computer-readable medium of claim 13, wherein a partial match of the input characters to the textual representation of a tag comprises meeting a predetermined threshold level of similarity between the input characters and the textual representation of a tag.

15. The non-transitory computer-readable medium of claim 11, wherein:

each image in the corpus of images is associated with a feature vector; and wherein identifying the set of images from the corpus of images relating to the input characters comprises:

generating an input feature vector of the input characters;

matching the input feature vector to feature vectors of the images in the corpus of images; and including those images in the set of images where the feature vector of the input characters has a threshold level of similarity to the input feature vectors of the images.

16. The non-transitory computer-readable medium of claim 15, wherein:

the feature vector of each of the images in the corpus of images is generated as a convolution of the image and metadata corresponding to the image; and matching the input feature vector to the feature vectors of the images in the corpus of images comprises matching elements of the input feature vector to elements of the feature vectors of the images that are derived from the metadata corresponding to the image.

17. The non-transitory computer-readable medium of claim 11, wherein clustering the images of the set of images into a plurality of clusters comprises clustering the images of the set of images into a determined number of clusters according to the execution of a K-means clustering algorithm utilizing metadata associated with the images of the set of images.

18. The non-transitory computer-readable medium of claim 11, the method further comprising:

providing the descriptive titles of the plurality of clusters as auto-completion options for the input characters; and for each auto-completion option for the input characters, providing access to the corresponding cluster of images.

19. A computer system configured to provide auto-completion options to input characters, the computer system comprising a processor and a memory, wherein the processor executes instructions stored in the memory as part of or in conjunction with additional components to respond to the user's query, the additional components comprising:

an auto-completion module that, in execution on the computer system configures the computing system to:

receive input characters as a request for auto-completion options;

identify a set of images from a corpus of images relating to the input characters;

cluster the images of the set of images into a determined number of image clusters, the determined number of image clusters is determined according to an amount of presentation space for presenting the auto-completion options;

for each of the image clusters, determine a descriptive title for the image cluster from data relating to the images in the image cluster; and provide the descriptive titles of the plurality of clusters as auto-completion options for the input characters;

wherein at least one of the auto-completion options for the input characters does not textually stem from the input characters.

20. The computer system of claim 19, wherein clustering the images of the set of images into a determined number of image clusters is carried out through the execution of a K-means clustering algorithm utilizing metadata associated with the images of the set of images.

\* \* \* \* \*